United States Patent [19]

Goward et al.

[11] 4,248,940

[45] Feb. 3, 1981

[54] THERMAL BARRIER COATING FOR NICKEL AND COBALT BASE SUPER ALLOYS

[75] Inventors: George W. Goward, North Haven; Delton A. Grey, Vernon, both of Conn.; Richard C. Krutenat, Richland, Wash.

[73] Assignee: United Technologies Corporation, East Hartford, Conn.

[21] Appl. No.: 811,807

[22] Filed: Jun. 30, 1977

Related U.S. Application Data

[62] Division of Ser. No. 612,439, Sep. 11, 1975, abandoned.

[51] Int. Cl.$^3$ .............................................. B32B 15/04
[52] U.S. Cl. ................................. 428/633; 427/34; 427/405; 427/419.2; 427/423; 428/678; 428/679; 428/685
[58] Field of Search ........ 428/610, 632, 633, 678–685, 428/937, 939; 427/34, 405, 419.2, 423

[56] References Cited

U.S. PATENT DOCUMENTS

| | | | |
|---|---|---|---|
| 2,937,102 | 5/1960 | Wagner | 106/57 |
| 3,091,548 | 5/1963 | Dillon | 428/336 |
| 3,481,715 | 12/1969 | Whalen et al. | 427/34 |
| 3,522,064 | 7/1970 | Valdsaar | 106/57 |
| 3,676,085 | 7/1972 | Evans et al. | 29/194 |
| 3,719,519 | 3/1973 | Perugini | 427/34 |
| 3,754,903 | 8/1973 | Goward et al. | 29/194 |
| 3,837,894 | 9/1974 | Tucker | 428/632 |
| 3,846,159 | 11/1974 | Bornstein et al. | 428/632 |
| 3,890,456 | 6/1975 | Dils | 428/632 |
| 3,927,223 | 12/1975 | Takabatake et al. | 427/34 |
| 4,055,705 | 10/1977 | Stecura et al. | 428/633 |

*Primary Examiner*—L. Dewayne Rutledge
*Assistant Examiner*—Michael L. Lewis
*Attorney, Agent, or Firm*—Steven F. Stone

[57] ABSTRACT

Adherent, thermal shock-resistant protective coatings for nickel base super alloys are obtained by applying to the base metal a thin bond coat of an alloy of chromium aluminum and yttrium with materials selected from the group consisting of iron, cobalt, nickel and nickel-cobalt and applying thereover a continuously graded mixture of this material with a zirconia-based ceramic, the concentration of zirconia-based ceramic increasing from the bond coat to the outer layer. The zirconia ceramic may be stabilized by the addition thereto of amounts of magnesium oxide or other materials.

11 Claims, No Drawings

THERMAL BARRIER COATING FOR NICKEL AND COBALT BASE SUPER ALLOYS

This is a division of application Ser. No. 612,439, filed Sept. 11, 1975, now abandoned.

BACKGROUND OF THE INVENTION

Plasma-sprayed metallic/ceramic thermal barrier coatings utilizing stabilized zirconium oxide are widely used to protect metal components exposed to high temperature conditions and, in general, reduce both the temperature of the base metal and the effects of thermal transients. Such systems are commonly used in combustion chambers, transition ducts and after burner liners in gas turbine engines and may also be used in protecting the vane platforms and air foils in various stages.

The most important feature of these coatings is their thermal insulating properties, since the magnitude of reduction in base metal temperature and transient thermal stress is related to the low thermal conductivity of the oxide component and the thickness of the coatings. In general, the desired properties of a practical thermal barrier coating are as follows:

(a) low thermal conductivity;
(b) adequate, adherence for resistance to thermal stress spalling, i.e., good interparticle and substrate bonding is required;
(c) maximum metallurgic integrity and oxidative/hot corrosion resistance of the metallic constituent;
(d) closest possible thermal expansion match between the ceramic and the substrate alloy;
(e) adequate stabilization of the desired (cubic zirconia) crystal structure to minimize effects of the non-linear thermal expansion caused by structural transformation; and,
(f) repairability during manufacturing and after field service.

The current state-of-the-art employs several ceramic-metal systems based on magnesia stabilized zirconia. In general, the base metal is a nickel or cobalt-base superalloy such as Hastelloy X, TD-nickel, or Haynes 188 which is coated with a bond layer of nickel-5% Al or nickel-20% chromium alloy, an intermediate metallic, stabilized zirconia ceramic layer and a top layer of stabilized zirconia. These layers are plasma-sprayed onto the base and the art now recognizes that improved performance and lower application costs can be achieved with nominally continuous grading processing methods by which the concentration of the zirconia is continuously increased from 0, at the interface between the bond layer and the base metal, to substantially 100 percent at the outer surface. Generally, these coatings are applied to a thickness of about 15 mils.

Detailed discussions representative of these various techniques can be found in U.S. Pat. Nos. 3,006,782 dated Oct. 31, 1961, to Wheildon for Oxide Coated Articles With Metal Undercoatings; 2,937,102 dated May 17, 1960, to Wagner for Zirconia Stabilization Control; 3,091,548 dated May 28, 1963, to Dillon for High Temperature Coatings; and 3,522,064 dated July 28, 1970, to Valdsaar for Stabilized Zirconia Containing Niobia and Calcium Oxide.

At present, one of the favored ceramic components is zirconia which can be used either alone or admixed with a material such as magnesium oxide, calcium oxide, yttrium oxide, $La_2O_3$, $Ce_2O_3$, which are known to stabilize the zirconia in the more desirable cubic form.

Accordingly, one of the best means for protecting nickel and cobalt-base superalloys from high temperature environments now known to the art, consists of a zirconia-based ceramic coating which is bonded to the base coating by a nickel-chromium or nickel-aluminum alloy in which the concentration of the ceramic increases either gradually or in discreet increments from the substrate to the outer coating.

While these advanced systems have been found to give good service, failures, when they did occur, were observed to be caused by oxidative degradation of the metallic constituent followed by exfoliation of the outer ceramic layers. Further, when failures did occur, repair of the items has been difficult because of the resistance of the metallic constituent to available acid-stripping solutions. According to this invention, we have found that proper selection of the bond coat metal produces substantial improvements in the performance of the thermal barrier as well as in the ease of repairability of the article.

It is, accordingly, an object of this invention to provide an improved ceramic/metallic thermal barrier coating for nickel and cobalt-base superalloys. This, and other objects of this invention, will be readily apparent from the following description:

DESCRIPTION OF THE INVENTION

According to this invention we have found that the use of an alloy of 10–25% chromium, 10–18% aluminum and less than 1% yttrium with materials selected from the group consisting of cobalt, iron, nickel, and nickel-cobalt as the bond coat and grading metal for a zirconia-base ceramic, produces an unexpected improvement in the thermal resistance of the barrier. These materials are known as MCrAlY alloys and are described in detail in U.S. Pat. Nos. 3,542,530; 3,676,085; 3,754,903 and co-pending application for NiCoCrAlY Ser. No. 469,186 filed May 13, 1974 now U.S. Pat. No. 3,928,026. The concentration of the bond coat and the zirconia is preferably continuously graded from zero percent ceramic at the interface between the base material and the bond coat to 100 percent ceramic at the exposed surface. It should be recognized that while the continuous gradation is clearly the preferred embodiment, one or more layers of discretely increasingly concentrations of zirconia can also be employed if equipment for continuous gradation is not available.

The zirconia used in this coating is preferably stabilized in the cubic form by the use of amounts of calcium oxide or magnesium oxide, as known to the art. In addition, the zirconia can also contain other oxides, such as $Y_2O_3$ and $La_2O_3$, which are also known to be permanent cubic stabilizers for zirconia or metastabilizers such as $CE_2O_3$. It is also possible to add antistabilizers such as nickel oxide, zinc oxide and cobalt oxide in admixture with the cubic stabilized zirconia to tailor the characteristics of the ceramic portions with respect to thermal shock resistance by selecting compressive strengths and thermal coefficients of expansion corresponding to the characteristics of the metal substrate. These specific techniques, per se, do not form a part of the applicants' invention and it should be recognized that the use of the term "zirconia," as hereinafter employed, includes zirconia-based ceramic materials which may be either pure zirconia or zirconia-admixed with one or more additives of which the above are exemplary.

The thermal barrier coatings of this invention can be applied by techniques known to the art using commercially available equipment. With respect to the following examples, the coatings were applied from a Plasmadyne model 1068 minigun using a 106 F45H-1 nozzle, a Plasmadyne model PS-61M 40 kilowatt power supply unit and two Plasmadyne model 1008A powder feeders. One powder feeder contained the bond coat alloy while the other powder feeder contained the zirconia, with both feeders being pressurized with argon. By varying the flow rate of the individual powder feeders, continuous gradation of the thermal barrier coating was obtained. The choice of the powder size of the materials is not critical and with the equipment used, it was found that the particle size of the metal bond coat alloy was preferably in the range of −270+400. This was not critical but merely idiosyncratic to the equipment used in that smaller particle sizes tended to melt too quickly and clog the nozzle of the spray gun.

EXAMPLE 1

Hastelloy X panels were coated with continuous graded nickel chromium plus MgO stabilized zirconia and were subjected to 100 hour and 200 hour static oxidization tests at 1800° F. Metallographic testing of the coating structures after test indicated that the nickel chromium component has substantially oxidized after 100 hours. Another sample was subjected to an oxidation test for one hour at 2000° F. followed by a water quench. Metallographic examination of the coating structure after these treatments showed degraded nickel almost completely oxidized, with cracks running vertically toward the base metal through the coating. Corresponding tests were also performed with Hastelloy X panels coated with 67.5% cobalt, 20% chromium, 12% aluminum, 0.5% yttrium plus 17% MgO stabilized zirconia with coating thicknesses varying between 0.009 to 0.014 inches. Metallographic examination of these samples after completion of the tests corresponding to the above, indicated substantially less oxidation of the bond coat which necessarily leads to a longer expected coating life. Fluidized bed testing of the various samples was also performed in which the specimens were exposed for two minutes at 1800° F. followed by two minutes cooling at room temperature. Using the cobalt, chromium, aluminum, yttrium-containing samples, testing was discontinued after 100 cycles with satisfactory adherence of the coating to the substrate alloy and upon metallographic examination, the components showed only partial oxidization. The nickel chromium samples, however, had been completely oxidized.

EXAMPLE 2

The inner surfaces of several full-scale Hastelloy X burner cans were from a JT8D-17 gas turbine engine were coated with the continuously graded MgO/ZrO$_2$-cobalt/chromium/aluminum/yttrium alloy noted above and subjected to experimental engine testing. In an 150 hour endurance test this alloy was substantially better with respect to edge spallation than the conventional 17% MgO/ZrO$_2$ Ni-20% Cr coating run on another burner in the same test.

While this invention has been described with respect to several specific examples thereof, it should not be construed as being limited thereto. For example, while the preferred embodiment of the invention employs the cobalt, chromium, aluminum, yttrium alloy set forth above, and 17% MgO stabilized ZrO$_2$, other compositions can be employed by workers skilled-in-the-art. The specific cobalt, chromium, aluminum, yttrium alloy employed in the examples is representative of the broad class of materials consisting of 15–40% chromium, 10–25% aluminum and less than 1% yttrium alloyed with iron, cobalt, nickel, or nickel-cobalt. This general class of materials is described, for example, in U.S. patents cited above. Accordingly, various modifications of this invention may be made by workers skilled-in-the art without departing from the scope of this invention which is limited only by the following claims, wherein:

We claim:

1. In a thermally protected superalloy structure which comprises a substrate of a material selected from the group consisting of nickel and cobalt-base superalloys, a metal bond coat on said substrate and an oxide stabilized zirconia-base ceramic thermal barrier coating on said bond coat, the improvement wherein said bond coat is an alloy of chromium, aluminum and yttrium with a metal selected from the group consisting of iron, cobalt, nickel and a mixture of nickel and cobalt.

2. The structure of claim 1 wherein said ceramic thermal barrier material is admixed with the bond coat alloy in a manner such that the concentration of the ceramic material increases continuously from the substrate to the finished surface.

3. The structure of claim 1 wherein said bond coat alloy is 15–40 percent chromium, 10–25 percent aluminum and 0.01–1 percent yttrium.

4. The structure of claim 3 wherein said alloy is a nickel, chromium, aluminum and yttrium alloy.

5. The structure of claim 1 wherein said alloy is a nickel, chromium, aluminum and yttrium alloy.

6. A coated article of manufacture having a thermal barrier coating system comprising
   a substrate selected from the group consisting of nickel-base alloys and cobalt-base alloys,
   a bond coating consisting essentially of a material selected from the group consisting of NiCrAlY, CoCrAlY and mixtures thereof covering said substrate, and
   a thermal barrier coating consisting essentially of zirconia stabilized with another oxide.

7. The thermal barrier coating system of claim 6 wherein said oxide is selected from the group consisting of ZrO$_2$—Y$_2$O$_3$ and ZrO$_2$—MgO.

8. The article of claim 6 wherein said bond coating is 15 to 40 percent chromium, 10 to 25 percent aluminum, and 0.01 to 1 percent yttrium.

9. A method of coating surfaces of nickel-base and cobalt-base alloys comprising:
   a. coating said surfaces with a bond coating consisting essentially of a material selected from the group consisting of NiCrAlY and CoCrAlY and mixtures thereof; and
   coating the coated surfaces formed in step (a) with a thermal barrier coating consisting essentially of an oxide stabilized zirconia.

10. The method of coating a metal surface as claimed in claim 9 where said oxide is selected from the group consisting of ZrO$_2$—Y$_2$O$_3$ and ZrO$_2$—MgO.

11. The method of claim 9 wherein said bond coating is 15 to 40 percent chromium, 10 to 25 percent aluminum and 0.01 to 1 percent yttrium.

* * * * *